J. H. HOLLAR.
ROLLER SKATE.
APPLICATION FILED AUG. 29, 1908.
931,064.
Patented Aug. 17, 1909.
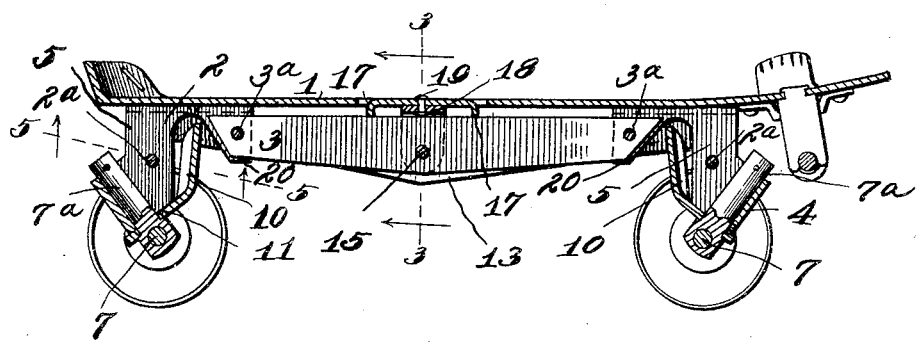
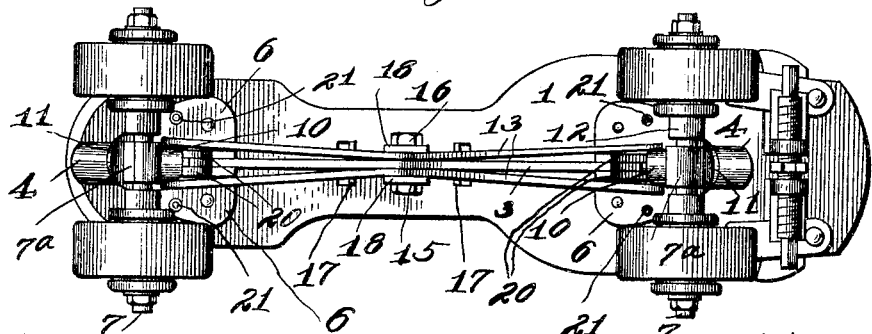
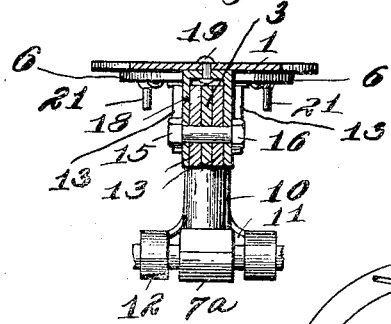
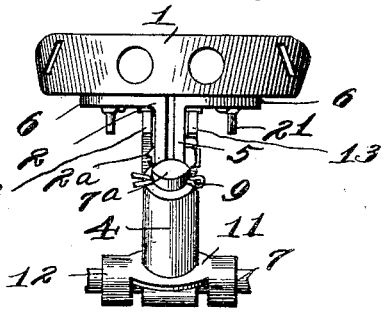
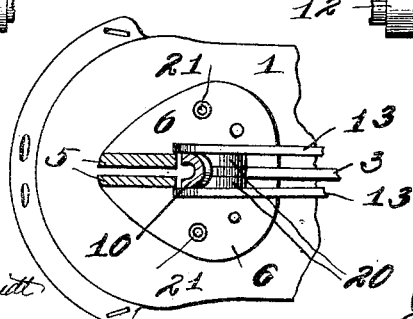
Witnesses:
Inventor.
Jeremiah H. Hollar
By Luther L. Miller
Atty

UNITED STATES PATENT OFFICE.

JEREMIAH H. HOLLAR, OF CHICAGO, ILLINOIS.

ROLLER-SKATE.

No. 931,064.     Specification of Letters Patent.     Patented Aug. 17, 1909.

Application filed August 29, 1908. Serial No. 450,852.

*To all whom it may concern:*

Be it known that I, JEREMIAH H. HOLLAR, a citizen of the United States, residing at Chicago, in the county of Cook and State of Illinois, have invented certain new and useful Improvements in Roller-Skates, of which the following is a specification.

One of the objects of this invention is to provide improved means for yieldingly holding the axles at right angles to the main frame.

Another object is to improve the means for supporting the axle.

The invention also relates to the other improvements in roller skates hereinafter set forth.

In the accompanying drawings, Figure 1 is a longitudinal sectional view of a roller skate embodying the features of my invention. Fig. 2 is a view of the under side thereof. Fig. 3 is a section on line 3 3 of Fig. 1. Fig. 4 is a rear end view of the skate. Fig. 5 is a section on line 5 5 of Fig. 1.

In the embodiment selected for illustration, 1 is a foot plate supported by a frame comprising the brackets 2 connected together by the longitudinally extending bar 3, which is spaced for the greater part of its length from the foot plate 1. Each bracket comprises a bearing socket 4, webs 5, and outstanding flanges 6 which are riveted or otherwise secured to said foot plate. The bracket may be formed of sheet metal in which event the blank will be bent to form the socket as shown with the two webs in close proximity and connected by an adjusting device, as a bolt $2^a$ whereby the webs may be brought together to take up wear in the socket. The bar 3 may be connected to the respective brackets in any well known manner, as by a rivet $3^a$ passed through ears 20 formed on the flange 6 and through the bar 3. The brackets support the spindle $7^a$ of the wheel-carrying axles 7. Each axle 7 has fixed to its middle portion a spindle $7^a$ adapted to lie in the bearing 4. The spindle $7^a$ is held against withdrawal from said bearing by means of a cotter pin 9 extending through said spindle and lying against the upper end of said bearing. An upwardly extending arm 10 is fixed to each axle 7 by suitable means, such as a plate 11 lying between the axle 7 and the bearing 4, the spindle $7^a$ passing through said plate and the latter having sleeves 12 thereon which embrace the axle. The axles 7 are held at right angles to the main frame by means of two leaf springs 13, said springs being secured to opposite sides of the bar 3 and between their respective ends by means of a bolt 15 and nut 16. The arms 10 attached to the axles 7 lie between the opposite free ends of said leaf springs. The springs 13 and the bar 3 are spaced a suitable distance away from the foot plate 1, and said foot plate is provided with lugs 17 struck therefrom, and which bear against the edge of said bar. A yoke 18 and the bolt 15 extending through said yoke, connect the bar 3 and the springs 13 to the foot plate. The yoke 18 may be secured to the foot plate 1 in any suitable manner, as, for instance, by a rivet 19. The pivotal movement of the axles 7 is limited by stop pins 21 fixed in the flanges 6 in position to be engaged by the springs 13 when the latter are flexed in the rotation of said axles in the bearings 4.

Any suitable means may be provided for securing the skate upon the foot.

It will be seen that a roller skate constructed in accordance with my invention is very strong and durable; also that the parts are few and simple, thereby lessening the cost of manufacture.

I do not limit myself to the exact construction herein shown and described, inasmuch as various changes may be made without departing from the spirit and scope of the invention.

I claim as my invention:

1. In a roller skate, in combination, a foot plate provided at each end with a bracket composed of an integral piece of sheet metal bent to form an axle spindle-receiving socket, axles having spindles pivotally supported in said sockets and having upright arms secured thereto, wheels mounted on said axles, a bar extending between said brackets, and leaf springs secured to opposite sides of said bar and having their ends engaging the upper ends of said arms.

2. In a roller skate, in combination, a foot plate; a bracket secured to each end of said foot plate, each of said brackets comprising a bearing; means for taking up wear on said bearings; spindles rotatable in said bearings; axles fixed to said spindles; and wheels on said axles.

3. In a roller skate, in combination, a foot plate, axle-supporting means at each end of said foot plate, axles carried thereby, wheels on said axles, a spaced bar longitudinally positioned beneath said foot plate and carried by the axle-supporting means, and a lug struck from said foot plate and bearing against the spaced edge of said bar.

4. In a roller skate, in combination, a foot plate; brackets secured to said foot plate, each of said brackets being formed of an integral piece of sheet metal bent to form a bearing and a web of double thickness adjacent said bearing; means for drawing said web together to take up wear on said bearing; and axles supported in said bearings.

5. In a roller skate, in combination, a foot plate; brackets secured to said foot plate, each of said brackets being formed of an integral piece of sheet metal bent to form a bearing and a web portion adjacent said bearing, said brackets having outstanding flanges lying against said foot plate and downwardly-projecting ears on said flanges; a bar connecting said brackets, the ends of said bar being secured between said downwardly projecting ears; and axles mounted in said bearings.

6. In a roller skate, in combination, a main frame; springs fixed to opposite sides of said frame; spindles rotatably mounted in said frame; axles fixed to said spindles; and arms fixed to said axles, the upper ends of said arms lying between and being engaged by said springs, the lower ends of said arms comprising plates lying between said axles and bearings, said spindles passing through said plates, the sides of said plates being bent around said axles.

7. In a roller skate, in combination, a foot plate; brackets secured thereto; spindles rotatably mounted in said brackets; axles fixed to said spindles; arms fixed to said axles; a bar connecting said brackets; springs fixed to opposite sides of said bar and engaging said arms; and stop pins on said brackets adapted to engage said springs and limit the rotation of said spindles.

8. A frame for roller skates comprising a foot plate; two axle-supporting brackets rigidly secured to said foot plates; a stiffening bar extending from one of said brackets to the other; and spacing means between said bar and said foot plate.

9. In a roller skate, in combination, a foot plate; a bracket rigidly secured to said foot plate near each end of the latter, each bracket having an axle-spindle-receiving socket; axles having spindles pivotally supported in said sockets and having upright arms secured thereto; wheels mounted on said axles; a bar extending from one of said brackets to the other and being rigidly secured to said brackets; a bracket secured to said foot plate centrally of the latter; two springs extending from one of said axle-supporting brackets to the other, the ends of said springs lying at opposite sides of said upright arms, said springs and said bar being attached to said central bracket; and spacing means between said foot plate and said bar and springs.

JEREMIAH H. HOLLAR.

Witnesses:
   LUTHER L. MILLER,
   ERNEST U. SCHROETER.